DIFFERENTIAL THERMAL ANALYSIS METHOD AND MEANS
EMPLOYING HIGH FREQUENCY HEATING
Filed Oct. 18, 1966

INVENTORS
STEPHEN A. WALD
CHARLES C. WINDING
BY
ATTORNEY
Wayne C. Jaeschke

United States Patent Office 3,477,274

Patented Nov. 11, 1969

3,477,274

DIFFERENTIAL THERMAL ANALYSIS METHOD AND MEANS EMPLOYING HIGH FREQUENCY HEATING

Stephen A. Wald, Swarthmore, Pa. (225 Canterbury Drive, Wallingford, Pa. 19086), and Charles C. Winding, 124 Olin Hall, Ithaca, N.Y. 14850

Filed Oct. 18, 1966, Ser. No. 587,503

Int. Cl. G01n *25/20*

U.S. Cl. 73—15 9 Claims

ABSTRACT OF THE DISCLOSURE

Differential thermal data is obtained from an apparatus employing high frequency heating. The sample and reference material are maintained in volumetrically constant configuration between the electrodes of a high frequency generator and heated simultaneously at the same rate.

The present invention relates to method and means useful in obtaining differential thermal data from materials of relatively low thermal and electrical conductivity. More specifically, one aspect of the present invention relates to a novel combination of means comprising a differential thermal analyzer employing high frequency heating. Another aspect relates to a novel analytical method for obtaining useful thermodynamic and kinetic data concerning material, and, in particular, polymeric materials of relatively low thermal and electrical conductivity.

Method and means are known in the art for obtaining thermodynamic and kinetic data employing differential thermal analysis herein after referred to as "DTA." Applying DTA, the difference in temperature is measured between a reference cell and a cell containing an active sample of the material to be investigated when both cells are heated at the same uniform rate. If both cells have about the same heat capacity any temperature difference must be accounted for by enthalpic changes occurring in the active sample not occurring in the reference material. DTA has been applied in the ceramics and polymer arts to study enthalpic changes during melting, polymorphic transformations, and glass transitions, for example. Unfortunately, however, the application of DTA to the quantitative study of chemical reaction kinetics has been limited to liquid phase reactions chiefly because the means known in the prior art are unsuited for gathering reliable quantitative data concerning chemical reactions occurring in the solid state such as curing, polymerization and thermal degradation. In the known apparatus, heat is conducted into samples through the retainer walls of the cell giving rise to thermal gradients within the sample which are intensified by reactions occurring in the active sample. Thus, the temperature of the sample varies with time at a programmed rate as well as with position in the sample at a rate determined by the programmed heating and the heat effect accompanying reaction. Mathematical resolution of the differential temperature data obtained under these conditions is not practicable. Sample minaturization does not provide a satisfactory solution to the problem. It is, therefore, the principal object of the present invention to overcome and eliminate the difficulties inherent in the DTA prior art and to provide novel method and means useful in obtaining accurate and precise differential thermal data heretofore unattainable.

Another object is to provide a novel combination of means useful in gathering differential thermal data in regard to solid polymeric, elastomeric and like materials.

Another object is to provide a novel method for obtaining meaningful data concerning chemical reactions occurring in polymeric, elastomeric and like materials.

Other objects and advantages inherent in the present invention will become apparent from the following description and disclosure.

These and other objects are generally accomplished in accordance with the present invention by the application of techniques, known in the high frequency electrical arts, for the purpose of internally heating thermally isolated reference and active samples in suitable means for differential thermal analysis. It is apparent as a result of the practice of the present invention that high frequency elecrical heating of the samples prepared for differential thermal analysis eliminates the chief drawback of prior DTA method and means by causing uniform heating throughout the samples thereby substantially eliminating the variable due to temperature gradients in the samples. Thus, temperature differences between an active and control sample of essentially the same heat capacity, maintained at essentially constant volume during the period of high frequency heating are a function of enthalpic changes in the active sample other than those changes occurring from heating. It is apparent that the method and means of the present invention, which are fore fully hereinafter described, will find a wide range of applications in obtaining useful and reliable kinetic as well as thermodynamic data concerning materials in the solid as well as liquid state including polymers, elastomers and the like.

For a better understanding of the method and means of the present invention, reference is now made to the figures of the drawing.

Figure 1:
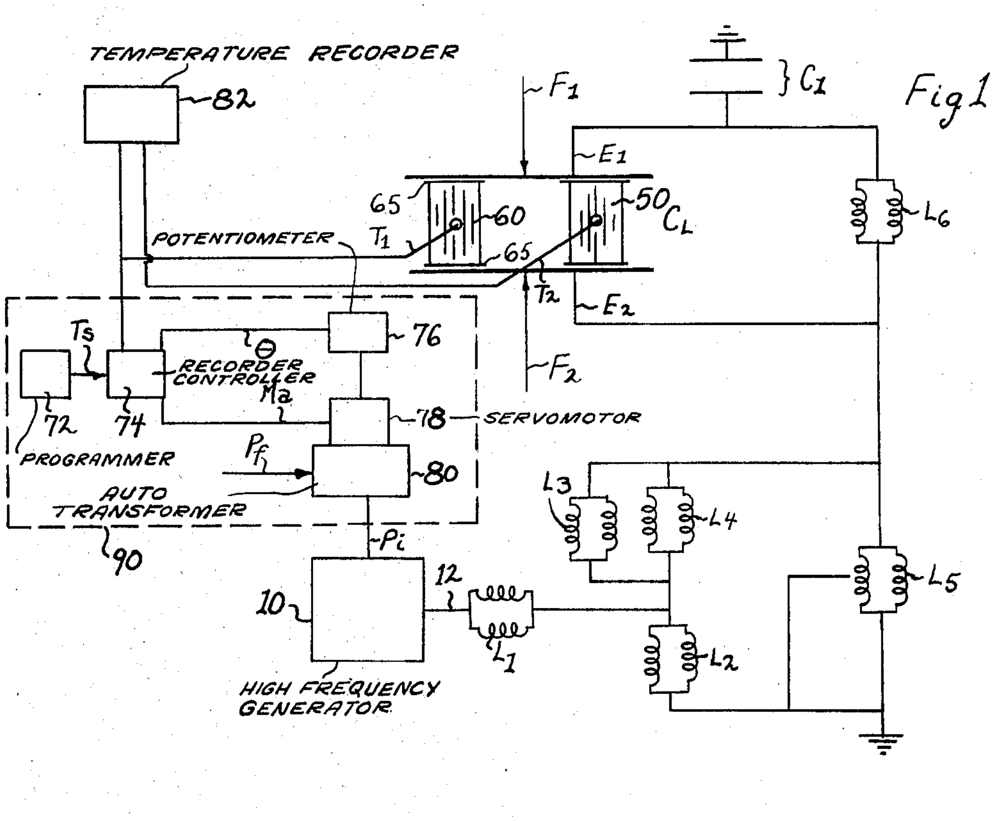
FIGURE 1 illustrates diagrammatically in elevation one preferred embodiment of means in accordance with the present invention.

Referring to FIGURE 1, a preferred combination of means is shown therein comprising a differential thermal analyzer incorporating high frequency electrical heating means. Elements of the combination include a high frequency generator 10, an output circuit including two electrodes $E_1$ and $E_2$ in spaced capacitative relationship, two thermally isolated sample container means 50 and 60, and a temperature measuring and controlling system including at least one temperature sensing element such as $T_1$ and $T_2$ for each sample container.

High frequency generator 10 is, generally, a vacuum tube power oscillator, which is a device for producing an alternating voltage, the frequency of which is independent of external excitation and depends only upon circuit constants of the oscillator. The function of the high frequency generator is to convert power at line frequency to power at high frequency which is dissipated as heat in the dielectric load contained within sample holders 50 and 60. While it is to be understood that any high frequency generation means known in the art may be suitably adapted for use in the present invention, in the practice of the present invention a Radio Frequency Company (Medfield, Mass.) Model 1500–F high frequency generator was employed which was rated at 1250 watts maximum output and operated at a nominal frequency of 86 megacycles per second (mc.) but which varies with load impedance. Generator means for providing nominal frequencies between about 10 and about 300 mc. are preferred for use in conjunction with the present invention. This generator contained a modified Hartley circuit which is well known in the art and requires no further explanation herein.

The output circuit is an electronic circuit loosely coupled to the plate circuit of generator 10 via line 12 which circuit draws off most of the plate current flowing at high frequency sinusoidal voltages. For analytical applications, a balanced configuration of the output circuit is essential in order to permit effective temperature measurement by means of thermocouples in the region between $E_1$ and $E_2$. The term "balanced configuration" means that both $E_1$ and $E_2$ are at high voltage with a virtual ground existing between them as distinguished from an unbalanced configuration wherein one electrode is grounded. $L_1$, $L_2$, and $L_3$ represent fine tuning coils each having a single loop fabricated from ten gauge copper with a moving clamp which allows the length of the current path and hence the inductance of the circuit to be adjusted. $L_4$ represents a coil having nine 2-inch diameter turns of ⅜ inch copper tubing, and $L_5$ is a tuning coil having six 1½-inch diameter turns of ¼-inch copper tubing. The number of effective turns in $L_5$ can be varied, e.g., by turning a grounded shaft running along its axis (not shown) which has a wiper to follow the spiral convolutions of $L_5$. $L_6$ represents a shunting coil comprising a loop of copper foil 16 inches long, ½-inch wide, and about 10 mils thick, attached to a 3 turn, 1-inch diameter pigtail coil made from ¼-inch copper tubing. The length of the foil loop can be adjusted to coarse tune the output circuit. The load condenser, $C_L$, consists of the two electrodes, $E_1$ and $E_2$, which comprise two parallel, 3¼ by 5¼-inch type 7075–T6 tempered aluminum alloy sheets, 1/16-inch thick. Electrode separation is usually dictated by the dimension of the load. A separation of $E_1$ and $E_2$ of 1-inch was found satisfactory for most applications. $C_1$ represents the capacitance between $E_1$ and a grounded high frequency shield (not shown) which, in the practice of the present invention was separated from $E_1$ by a two inch thickness of polypropylene.

In the practice of the present invention, it is essential to provide rigid support for the output electrodes $E_1$ and $E_2$ which are subjected to pressures as high as several hundred p.s.i. during the heating of compounds such as elastomers, for example. Any distortion of the geometry of the electrodes during a run introduces a variable which cannot readily be accounted for. Therefore, suitably rigid support means represented schematically by $F_1$ and $F_2$ must be provided to counteract forces generated within 50 and 60 which act perpendicular to $E_1$ and $E_2$ which support means do not interfere with the electronic function of the output circuit. In the practice of this invention, electrode supports (not shown) made from polypropylene were found to exhibit satisfactory mechanical as well as electrical properties.

While the output device described in the preferred embodiment includes electrode means for effecting dielectric heating, electrode means for effecting magnetic heating of samples suitably prepared by the inclusion of magnetically active material, e.g., finely powdered iron, is within the scope of the present invention.

In a preferred embodiment, at least two, thermally isolated sample container means 50 and 60 are provided to permit simultaneous heating of samples between the electrodes. The sample containesr must have suitable mechanical strength to maintain the samples in volumetrically constant configuration even at elevated pressures of several hundred p.s.i. and must be made from nonmetallic material having suitable electrical properties in a high frequency field. Very satisfactory results were achieved using sample containers consisting of type 7740 Pyrex glass ring, two inches inside diameter by 1⅛ inches high, and ⅛-inch wall, with a 1/16-inch diameter hole sandblasted at the mid-circumference, 9/16 inch from each edge, through which a thermocouple was inserted. The rings were capped at each end by tempered Masonite covers 65, each turned to a diameter of 2½ inches from a three-inch square blank cut from ¼-inch sheet and the thickness shaved to 3/32 inch up to a radius of 1⅛ inches leaving a ⅛-inch wide by 3/16-inch high lip at the periphery. A 2¼-inch diameter piece of one mil Teflon film (not shown) was placed in the sample cover recess to prevent rubber from curing to raw Masonite surface.

The sample containers of this design are strong and durable. Both glass and Masonite are sufficiently loosy, i.e., have sufficiently large dielectric loss factors, to heat moderately well in a high frequency field, but not sufficiently lossy to act as short circuit drawing current away from the samples. Some heating of the container in the high frequency field is desirable since it reduces heat losses from the samples. Polytetrafluoroethylene sample containers, for example, can be employed but are not preferred since they do not heat in an electric field and lack rigidity at elevated temperatures. Polycarbonate containers, while satisfactory at low temperatures, become so lossy above about 140° C. that they rapidly soften.

The respective temperatures of samples disposed in containers 50 and 60 are measured by means of suitable temperature sensing elements which are preferably thermocouples $T_1$ and $T_2$. Satisfactory results were achieved employing an iron-constantan ungrounded junction unit with a 0.040-inch outside diameter by 4 inch long type 304 stainless steel probe. To achieve satisfactory results, the thermocouple should be positioned symmetrically between the electrodes, or, more generally in the null equipotential plane which is symmetrically located only when the null plane bisects the region between the electrodes. $T_1$ and $T_2$ can be connected to suitable recording means 82 to record either $T_1$ and $T_2$ or $T_2$ and $(T_1-T_2)$ as desired. $T_1$ can be connected, additionally, to recording controller 74 as a means of achieving programmed temperature control as hereinafter described.

Programmed temperature control of the high frequency heating of the samples was achieved using a conventional cam position-adjusting-type control system shown within the box formed by dashed line 90. Within the box, 72 represents a cam-type programmer, e.g., Leads and Northrup Co., Model 101701; 74 represents a recording controller, e.g., Leads and Northrup Co., Speedomax H Model S; 76 represents a precision potentiometer, e.g., General Radio Co., Type 976–K1000; 78 represents a servomotor, e.g., Superior Electric Co., Type SS5 OPE SLD SYN; 80 represents an autotransformer, e.g., Superior Electric Co., Model 15 M D136 BT Powerstat. In operation the closed-loop (feedback) control system compares the temperature of the reference sample contained, e.g., in 60 with the programmed set point, $T_s$, and, according to the direction and size of their deviation, through output signal $M_a$, increases or decreases the power input, $P_i$ to high frequency generator 10. $P_f$ represents the line power feed to autotransformer 80. The symbol $\theta$ represents the angular position of the autotransformer which is fed back to 74 when a position-adjusting type control system is employed. The operation of the system 90 being conventional, no further explanation is required herein. It is noted that satisfactory temperature measurements were achieved where the reference thermocouple, e.g., $T_1$ was used as the source of both differential temperature at 82 in conjunction with the sample thermocouple $T_2$ and the source of absolute temperature fed back to the recorder controller 74. It is to be understood that while programmed heating at a predetermined rate is preferable, manual control of the rate of heating affords satisfactory results and is therefore within the scope of the present invention.

In order to illustrate the application of the means of the present invention hereinabove described, examples of operations are set out below, which should not be construed as unduly limiting thereof.

EXAMPLE 1

A one-to-one mixture of diphenyl and precipitated, nonignited calcium carbonate, e.g., available commercially under the trade name of "Millical," was prepared by grinding in a mortar. This calcium carbonate is electronically active and proves heat to inactive materials such as diphenyl, polyethylene and polypropylene. Any suitably electronically active material, e.g., carbon black, aluminum oxide and talc can be employed. The mixture was packed into a 1-inch diameter by 1-inch high polycarbonate ring, cut from 1/16-inch wall tubing and placed between $E_1$ and $E_2$. A thermocouple, e.g., iron-constantan, was inserted to the sample's center, Fiberglas insulating material placed around the sample to reduce convention heat losses, and the power was normally adjusted manually to give the desired rate of heating. The temperature of the sample was sensed continuously by the thermocouple and displayed on a Sargent Model MR recorder. Following this run, the operational variables were duplicated on a reference material thermally identical to the sample, which in this example consisted of a one-to-one mixture of polypropylene and "Millical." The differential thermal data obtained in accordance with the above described method are graphically represented in FIGURE 2.

Figure 2:
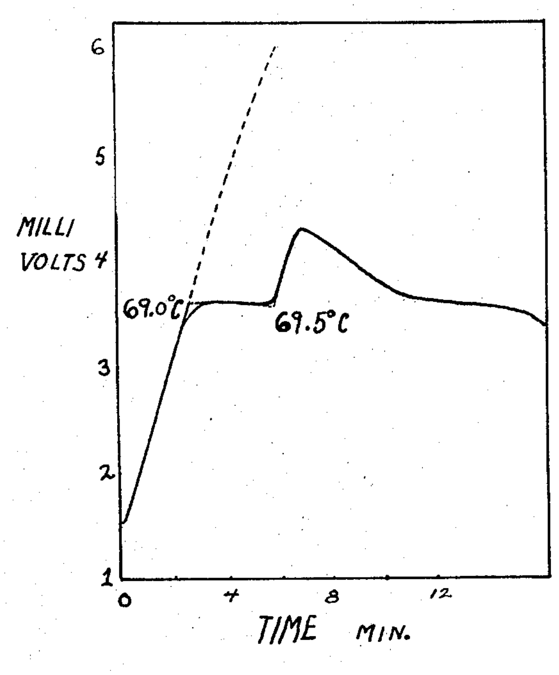
FIGURE 2 represents a thermogram of differential temperature data obtained employing the method and means of the present invention.

FIGURE 2 shows the heating and cooling thermograms for a one-to-one mixture of diphenyl and "Millical." The extrapolated initial and end points of the arret in the heating curve, which differ by only about ½° C., correspond to the melting range observed independently. The cooling arret is broader than the heating arret because a zone freezing, non-isothermal process is occurring. The dotted line superimposed in FIGURE 2 is for a polypropylene-Millical reference mixture. The vertical distance between the end point of the heating arret and the reference curve is 42.0° C. Assuming that the average specific heat of the mixture is 0.3 one would predict from known relationships the heat of fusion to be 25.2 cal./gram. This agrees to within 4% of the published value of 26.1 cal./gram.

EXAMPLE 2

The procedure specified in Example 1 is modified such that the reference sample in container 60 and the active sample, e.g., in container 50 are heated simultaneously. The same thermogram of FIGURE 2 is obtained.

EXAMPLES 3 and 4

In accordance with the procedure of Example 1 thermograms such as are presented in FIGURE 2 were obtained firstly, for a one-to-one mixture of benzoic acid and "Millical" and secondly, for a one-to-one mixture of polyethylene and "Millical." In each case the reference thermogram was obtained employing a one-to-one mixture of polypropylene and "Millical." The heat of fusion of benzoic acid calculated (by known relationships) from the thermogramic data thus obtained was 34 cal./gram. The accepted value for benzoic acid is 33.9 cal./gram. In the case of polyethylene heat of fusion calculated from thermogramic data was 68 cal./gram as compared with the accepted value of 66.2 cal./gram.

These examples illustrate certain of the advantages of differential thermal analysis employing high frequency heating (DTA/HF) over DTA which include: (1) in DTA/HF the enthalpy change accompanying a physical transition or chemical reaction is proportional to the distance between two curves rather than the area under a curve, (2) there are no calibration coefficients in DTA/HF; (3) DTA/HF strictly defines a melting point or range by an arret, while in DTA the apex of the peak does not necessarily correspond to the melting temperature. Other advantages accrue in DTA/HF because the sample is thermally isolated from the reference whereas in DTA, by design, any difference in temperature is quickly dissipated to the sample holder and thermocouple to re-establish the base line. As a consequence temperature differences as great as 50° C. can be established in DTA/HF as compared with fractions of degrees in DTA. Other obvious procedural advantages of DTA/HF include the fact that relatively large samples can be employed, and signal amplification and base line drift compensation are obviated.

Another set of experiments, set out below, were conducted to illustrate the application of DTA/HF to obtain data on the heat effects and reaction kinetics of curing such as the dicumyl peroxide (DCP) curing of hydrocarbon polymers.

EXAMPLES 5–8

In these examples, a high frequency generator operating at a nominal frequency of 86 mc. and rated at 1250 watts maximum power output heated the sample, e.g., in 60, and reference, e.g., in 50, via interaction with an electronically active filler, precipitated $CaCO_3$, mill-mixed into the subject polymer. The 2 inch diameter by 1⅛ inch high samples, enclosed in Type 7740 Pyrex glass rings and tempered Masonite covers, were clamped between the electronically balanced output electrodes. The entire output assembly was designed to withstand the considerable swelling pressures generated during vulcanization. Temperature and differential temperature were measured with miniature probe-type ungrounded junction thermocouples inserted perpendicular to the axis of the cylindrical sample and exactly in the mid-plane between the parallel output electrodes. Standard recorders worked satisfactorily without any external RF filtering although their position relative to the output device was critical, as was the configuration of the thermocouple leadwires.

The DTA/HF analysis of thermographic data on the DCP curing of cis - 1,4 - polyisoprene filled with 50 phr. of $CaCO_3$ indicated that the first order DCP decomposition was rate controlling from about 155 to 180° C. for DCP concentrations ranging from 1.5 to 4.5 phr. Both the activation energy of 32.6 kcal./mole DCP and values of specific rate constants agreed closely with figures extrapolated from published studies at temperatures below 160° C. The thermographic data were very precise.

Above 180° C. the data indicated a departure from simple first order kinetics, which was rationalized as a shift in control from DCP decomposition to the isoprenyl radical termination-type cross-linking reaction. A weak propagation-type cross-linking step was an essential element of the proposed reaction scheme above 180° C., with an average of about three such cross-linking steps occurring per molecule of DCP decomposed. It was shown that heat losses could not explain the departure from first order kinetics.

The systematic increase in the enthalpy of curing with the temperature range of curing was interpreted as further evidence for a propagation-type cross-linking step. For experiments completed by 180° C., the enthalpy of curing ranged from 60 to 80 kcal./mole DCP, in full agreement with predicted values based on bond energies. As the proportion of curing taking place above 180° C. increased, the enthalpy of curing increased to 114 kcal./mole DCP. It was demonstrated experimentally that heat losses could not account for this variation in the enthalpy of curing.

DTA/HF experiments on the DCP curing of stereo SBR and cis - 1,4 - polybutadiene both compounded with 50 phr. of $CaCO_3$ and 0.5 phr. of DCP showed that the rate of curing was controlled by the rate of DCP decomposition as predicted by published studies at lower temperatures. The very large heat effects of these reactions were explained by the extensive occurrence of a propagation-type cross-linking reaction. Furthermore, in stereo SBR, the frequency of this reaction varied with the temperature range of curing: about eight propagation-type cross-linking steps occurred per molecule of DCP for low temperature range runs and about thirty for very high temperature range runs. This result supports the proposed mechanism for high temperature curing of cis-1,4-polyisoprene. As expected the cis-1,4-polybutadiene underwent slightly more extensive propagation-type cross-linking as judged by the measured enthalpy of reaction, with a maximum of about 36 propagation-type cross-linking steps per molecule DCP.

A preliminary investigation of the DCP curing of ethylene-propylene rubber (EPR) suggested that DTA/HF is capable of sensing the balance between competing vulcanization and degradation reactions.

Experiments 5–8 and the results obtained therefrom prove that the novel combination of means and method of the present invention comprises a powerful analytical tool for measuring thermodynamic and kinetic parameters of curing heretofore unattainable by any method or means. At temperatures above 150° C. it is more accurate and precise than any existing analytical technique, whether physical, chemical, or thermal in nature. Furthermore, the uncomplicated mechanical and electrical design of the DTA/HF apparatus, its relatively low cost, and the simplicity of its operation mark it as highly practical.

Having thus described the invention with reference to specific examples thereof, many modifications and alterations thereof will become apparent to those skilled in the art without departing from the spirit and scope thereof. For example, it is within the scope of the present invention to obtain useful thermal data employing the novel combination of means of the present invention using techniques known in the art of differential scanning calorimetry (DSC). That is to say by supplying differential quantities of power to eliminate any temperature difference between the active and reference samples during the period of heating thereof, useful thermal data can be derived from the record of differential power supplied.

Reference is made to the publication of the inventors relating to this subject matter which first appeared in Analytical Chemistry, vol. 37, p. 1622 (November 1965), and a thesis entitled Differential Thermal Analysis of Polymers Using High Frequency Electrical Fields presented at Cornell University, Ithaca, N.Y. (June 1966) by Stephen A. Wald, co-inventor herein. Mathematical relationships and explanations of the theoretical aspects of DTA/HF are set forth in the referenced publications.

What is claimed is:

1. A device useful in obtaining differential thermal data from a reference and an active sample of polymeric, elastomeric, and like materials which comprises in combination:

(1) rigid, non-metallic means adapted to contain a sample of the material being tested in volumetrically constant configuration;

(2) high frequency alternating electrical generation means electrically connected to electrode means, said electrode means being in spaced relationship with said non-metallic means for internally heating a sample contained within said non-metallic means at a desired rate;

(3) means for sensing the temperature of a sample contained in said non-metallic means.

2. The device of claim 1 containing at least two of said rigid, non-metallic means thermally isolated from each other whereby an active and a reference sample can be heated simultaneously at the same rate.

3. The device of claim 1 in which said rigid, non-metallic means comprises a hollow glass cylinder having non-metallic cover means adapted to fit the ends thereof.

4. The device of claim 1 having programmed temperature control means associated with said high frequency alternating generation means and said temperature sensing means for heating a sample at a predetermined rate.

5. The device of claim 1 in which said electrode means consist of two, rigid, metallic parallel plates in spaced capacitative relationship with each other.

6. The device of claim 1 in which said means for sensing temperature comprises at least one thermocouple.

7. The device of claim 1 in which said means for sensing temperature is connected to means for recording such temperature.

8. The method of obtaining differential thermal data from a reference sample and at least one active sample of a polymeric, elastomeric, or like material of relatively low conductivity which comprises providing a high frequency dielectric heating zone, maintaining a reference sample having essentially the same thermal and electrical properties as the material to be tested in said dielectric heating zone at essentially constant volume to internally heat said sample at a desired rate, sensing the temperature of said sample; maintaining an active sample of material to be tested in said dielectric heating zone at essentially constant volume to internally heat said active sample at essentially the same rate as said first sample, and sensing the temperature of said active sample.

9. The method of claim 8 in which said samples are simultaneously maintained and heated within said high frequency dielectric heating zone.

References Cited

UNITED STATES PATENTS

| | | | |
|---|---|---|---|
| 2,738,406 | 3/1956 | Zaleski | 219—10.55 |
| 3,218,430 | 11/1965 | Bayerl | 219—10.65 |
| 3,283,560 | 11/1966 | Harden et al. | 73—15 |

OTHER REFERENCES

Wald et al.: Differential Thermal Analysis Using High Frequency Electrical Fields, Analytical Chemistry, vol. 37, pp. 1622–1624 (November 1965).

Clampitt: Differential Thermal Analysis of Linear Polyethylene-High Pressure Polyethylene Blends, Analytical Chemistry, vol. 35, pp. 577–579 (April 1963).

JAMES J. GILL, Primary Examiner

H. GOLDSTEIN, Assistant Examiner